Jan. 5, 1960
E. E. BERKLEY ET AL
2,919,573
APPARATUS FOR MEASURING FIBER PERMEABILITY
Filed Oct. 1, 1956
2 Sheets-Sheet 1
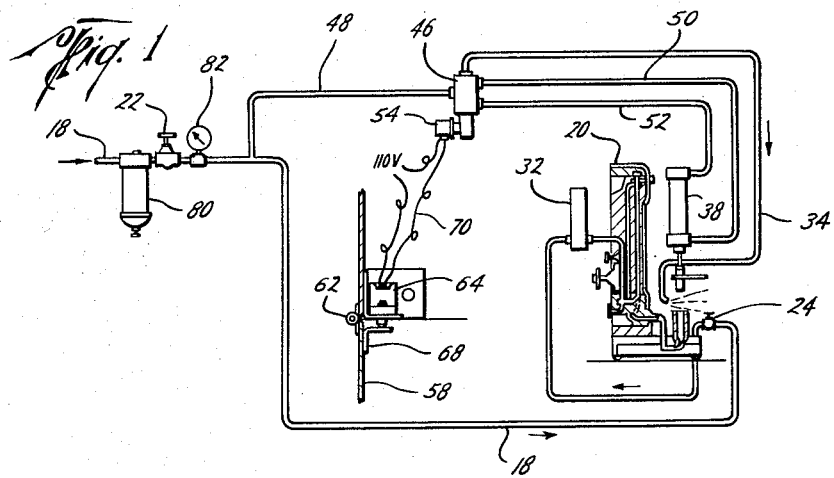
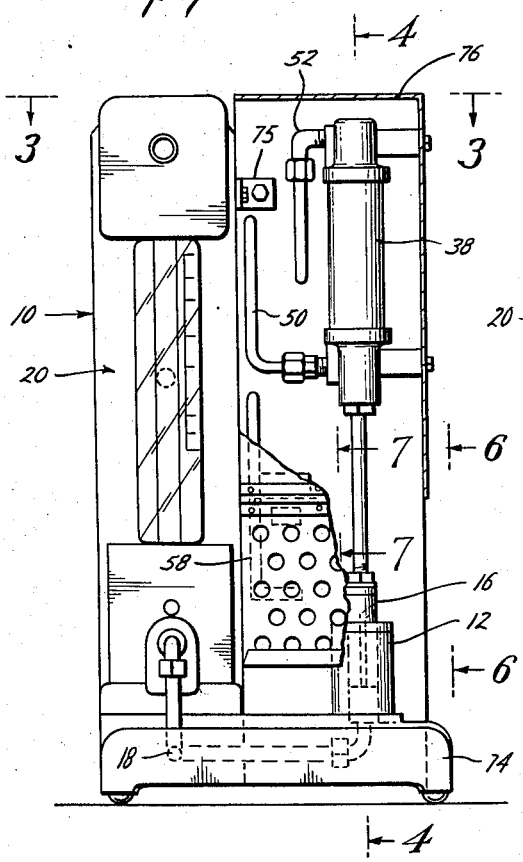
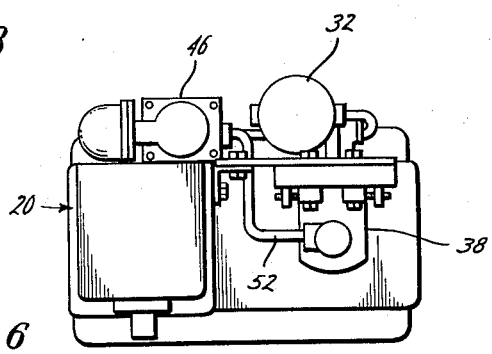
Earl E. Berkley
Samuel C. Mayne, Jr.
John A. Reddick
INVENTORS
BY
ATTORNEYS

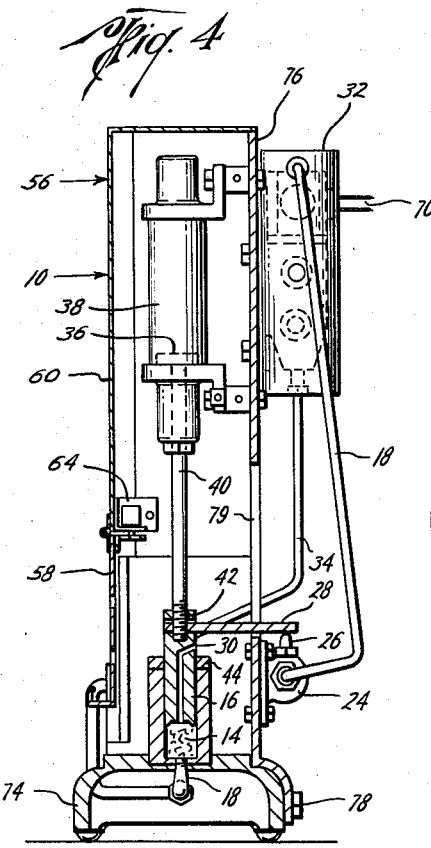
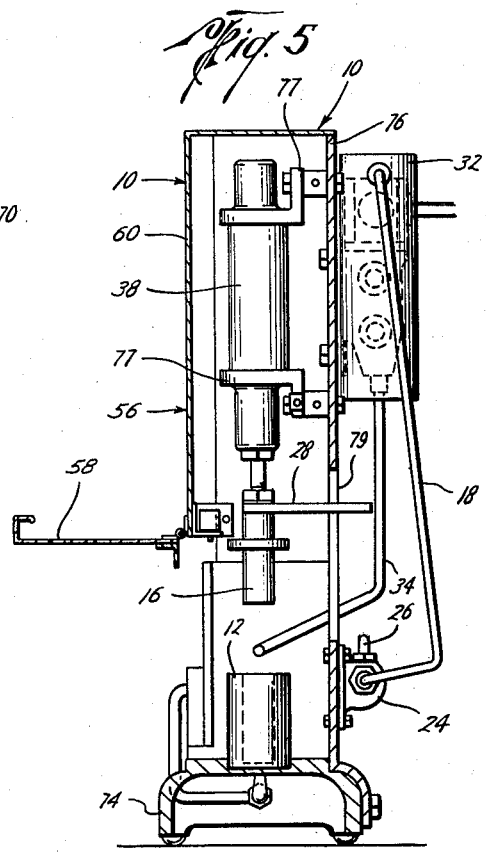
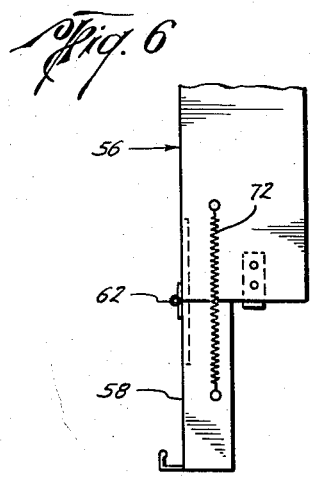
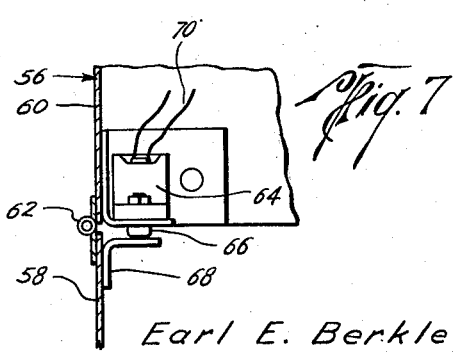
Earl E. Berkley
Samuel C. Mayne, Jr.
John A. Reddick
INVENTORS

United States Patent Office 2,919,573
Patented Jan. 5, 1960

2,919,573

APPARATUS FOR MEASURING FIBER PERMEABILITY

Earl E. Berkley, Samuel C. Mayne, Jr., and John A. Reddick, Houston, Tex., assignors, by mesne assignments, to The Sheffield Corporation, Dayton, Ohio, a corporation of Delaware Application October 1, 1956, Serial No. 613,242

16 Claims. (Cl. 73—38)

This invention relates to an apparatus for measuring fiber permeability and more particularly to such an apparatus which is semi-automatic in operation.

For various reasons it is sometimes necessary to know the permeability to gas flow, especially air flow, of various fibers. For example, the permeability to air flow of lint cotton is often used as an indication of its fineness and the present invention is especially adapted to determining the permeability of cotton although it may be used to determine the permeability to gas flow of various other fibers.

In operation today are certain apparatuses for measuring fiber permeability which utilize a test chamber having a supply line supplying air approximate one end of the test chamber, a gas flow gauge in the supply line to measure the rate of flow of air through the chamber, a perforated closure member fitting into the chamber which may be removed so the fiber can be inserted for testing and withdrawn from the chamber after testing. It is toward an improvement in such an apparatus for measuring fiber permeability that the present invention is directed.

During the time that the air is flowing through the test chamber and gas flow gauge it is desirable that the operator have at least one hand free to make notations of readings on the gas flow gauge. It is therefore a general object of the present invention to provide an apparatus for measuring fiber permeability in which no controls need be operated during the time readings of the flow gauge are being noted.

Another general object of the present invention is to provide an apparatus for testing fiber permeability which requires a minimum of time in conducting the test.

A further object of the present invention is the provision of such an apparatus in which a single control begins and stops the test.

A still further object of the present invention is to provide an apparatus for testing fiber permeability having a guard protecting the operator from moving parts which guard includes the single control for beginning and ending the test.

Another object is to provide an apparatus for testing fiber permeability which reduces operator fatigue by having a minimum amount of work and observation required of the operator.

Another object of the present invention is to provide an automatic means for ejecting the tested fiber from the test chamber and deflecting it away from the working area.

A still further object of the present invention is to provide such an apparatus for measuring fiber permeability which is semi-automatic in operation and yet economical to construct and dependable in operation.

Other and further objects, features, and advantages will be apparent from the following description of the preferred example of the invention, given for the purposes of disclosure and taken in conjunction with the accompanying drawings, where like character references designate like parts throughout the several views, and where:

Figure 1 is a diagrammatic and schematic illustration of the apparatus of the present invention, Figure 2 is a front elevation, partially in section, of the apparatus of Figure 1, Figure 3 is a view along the line 3—3 of Figure 2, Figure 4 is a view along the line 4—4 of Figure 2, illustrating the apparatus with the test chamber closed, Figure 5 is a view similar to Figure 4 illustrating the apparatus with the test chamber open, Figure 6 is an enlarged view along the line 6—6 of Figure 2, and Figure 7 is an enlarged fragmentary view along the line 7—7 of Figure 2.

Referring now to the drawings, and particularly to Figures 4 and 5, the apparatus indicated generally by the numeral 10 includes a test chamber 12 which is generally cylindrical in shape and open at its upper end into which is inserted fiber 14, such as lint cotton, to be tested by the passage of air through the test chamber 12 after the cotton has been compressed to a predetermined density by the closure member 16. As seen in Figures 1 and 2, air is supplied to the test chamber 12 by a supply line 18 which passes through a flow gauge indicated generally by the numeral 20 before reaching the test chamber 12. Thus the velocity of flow through the test chamber 12 and the permeability of the fiber in rate of flow is indicated on the flow gauge 20. To help regulate the pressure of air through the flow gauge 20 a pressure regulator 22 is provided in the gas supply line 18. A satisfactory flow gauge 20 and pressure regulator 22 are illustrated in the Fluid Leakage Gauging Device described in Patent No. 2,593,957, issued April 22, 1952 to W. F. Aller. In view of the detailed description given in this Patent No. 2,593,957, no further description of the flow gauge 20 or the pressure regulator 22 is necessary. Of course, other types of flow gauges and regulators may be used.

To permit and stop the flow of air through supply line 18 into the test chamber 12, a two-way valve 24 (see Figures 1, 4 and 5) is provided in the gas supply line 18 adjacent the test chamber 12 and the closure member 16. This valve 24 includes a plunger 26 on the top side thereof which plunger 26 opens the valve 24 when the plunger 26 is depressed and closes the valve 24 when the plunger 26 is released. A two-way valve such as one identified by catalog number 8632W of A. Schrader's Son, Division of Scovill Mfg. Co., Inc., 470 Vanderbilt Avenue, Brooklyn 38, N.Y. is satisfactory and no further detailed description thereof is necessary. Other such two-way valves are well known and readily available on the market.

Mounted on the closure member 16 and reciprocating therewith in a manner which will be described later is an actuating member or arm 28 which depresses the plunger 26 when the test chamber 12 is closed by the closure member 16 as illustrated in Figure 4 permitting air to flow into the test chamber 12. This actuating member 28 moves free from the plunger 26 as best seen in Figure 5 when the closure member 16 is reciprocated out of the test chamber 12 opening the test chamber. Thus closing the test chamber 12 by the closure member 16 automatically allows air to flow into the test chamber 12 and opening this test chamber 12 automatically cuts off the flow of air through the valve 24 into the test chamber 12.

As it is necessary for air to flow through the fiber 14 and out of the test chamber 12 during the test, a passageway is provided through the test chamber 12 spaced from the point of entrance of air through the supply line 18. This is preferably done by providing a passage 30 through the closure member 16 between the interior of the test chamber 12 and the exterior of the closure member 16.

A reservoir or accumulator 32 (see Figures 1 and 3) is provided in the supply line 18 between the valve 24 and the test chamber 12. Upon the opening of the test chamber 12 and simultaneous closing of valve 24 by the upward movement of the closure member 16 there is sufficient gas pressure in accumulator 32 to force the fiber sample 14 upwardly out of the test chamber 12 where it is deflected away from the working area by a blast of air from the deflection line 34 (see Figures 1 and 5) as will be explained more fully later.

By placing the accumulator 32 in the supply line 18 ahead of the flow gauge 20 the acceleration of air flow into the flow gauge 20 upon opening the valve 24 is less than what it would be if there were no accumulator 32 there. This allows the flow gauge 20 to come to equilibrium quicker and reduces the time required for each test.

Means are provided to move the closure member 16 into and out of the test chamber 12 and such means includes (see Figures 4) the double acting piston 36 slidable in the cylinder 38 above the test chamber 12. The piston 36 is connected by a piston rod 40 to the closure member 16, such as by being tapped as at 42, so that reciprocation of the piston 36 moves the closure member into and out of the chamber 12 closing and opening it respectively. A shoulder 44 on the closure member 16 limits the downward movement of the closure member 16 (see Figure 4).

To actuate and control the direction of movement of the piston 36 and hence the closure member 16 and to control the air blast from the deflection conduit 34 there is provided a four-way solenoid operated valve assembly 46 best seen in Figures 1 and 3, connected to a source of air pressure such as by line 48 which is connected to the supply line 18. Cylinder conduits 50 and 52 from four-way valve assembly 46 supply or exhaust air from the lower and upper ends respectively of cylinder 38 on each side of piston 36. Connected to the exhaust port of the four-way valve assembly 46 is the deflection conduit 34. When the electrical current is applied to the solenoid 54 of the four-way valve assembly 46, air under pressure from supply line 18 and line 48 passes through the four-way valve assembly 46 and through the cylinder conduit 52 to the upper end of the cylinder 38 moving the piston 36 downwardly closing the test chamber 12. Air is forced out of the lower end of cylinder 38 by the downward movement of piston 36, through the cylinder conduit 50, through the four-way valve assembly 46, and out the deflection conduit 34. As the fiber sample at this time has been placed in the test chamber 12 it is not disturbed by air flow from the deflection conduit 34 even through the test chamber 12 is open at the beginning of the downward movement of closure member 16. Removing electrical energy from the solenoid 54 actuates the four-way valve assembly so that air pressure through the gas supply line 18 and line 48 passes through the four-way valve assembly 46 into cylinder conduit 50 to the lower end of cylinder 38 moving the piston 36 upwardly exhausting air through cylinder conduit 52, through the four-way valve assembly 46 and out the deflection conduit 34. When the test chamber 12 is opened by this upward movement of the closure member 16 the air pressure in the accumulator 32 blows the fiber sample 14 upwardly to the upper end of the test chamber 12 where it is deflected from the working area by the air exhausting from the deflection conduit 34. Solenoid operated four-way valves are conventional and readily available on the market, such as the four-way solenoid valve, catalog No. 3320S–110 volt of A. Schrader's Son, Division of Scovill Mfg. Co., 470 Vanderbilt Ave., Brooklyn 38, N. Y. and thus no further description of this four-way valve assembly 46 is deemed necessary.

As best seen in Figures 2, 4, 5 and 6 a sheet metal guard assembly 56 is mounted on the apparatus 10 in front of the test chamber 12. The lower part of the guard assembly 56 has the movable guard member 58 hingedly secured for vertical swinging to the fixed upper plate 60 of the guard assembly 56 by a hinge 62 (best seen in Figure 7). This movable guard member 58 serves the double function of protecting the operator from the descending closure member 16 and actuating the four-way valve assembly 46. As seen in Figure 2 the movable guard member 58 is perforated to permit observation in the vicinity of the test chamber 12 when the guard member 58 is down.

As best seen in Figures 1 and 7, a limit switch 64 is secured to the rear of the guard assembly 58 with the actuating plunger 66 of this limit switch 64 directed downwardly approximate the level of the hinge 62. An L-shaped bracket 68 is secured to the movable guard member 58 so that it bears on the actuating plunger 66 of the limit switch 64 when the movable guard member 58 is in a vertical or closed position. This limit switch 64 is part of an electrical circuit 70 (see Figure 1) supplying electrical energy to the solenoid 54 of the four-way valve assembly 46 which circuit 70 is closed when the bracket 68 bears against the plunger 66. Opening of the movable guard member 58 opens the limit switch 64 and opens the electrical circuit 70. Such limit switches are commercially manufactured and available on the market and no further description thereof is deemed necessary. A limit switch having catalog number 9007–A02 of Square D Company of Detroit, Michigan is quite satisfactory.

To hold the movable guard member 58 in open and closed positions a tension spring 72 is secured at one end to the fixed upper plate 60 and at the other end to the movable guard member 58 to the right of the hinge 62 as viewed in Figure 6.

Various supporting elements for the various parts of the apparatus 10 are provided and include the base 74 on the left side of which as viewed in Figure 2 is mounted the flow gauge 20 and on the right side of which is mounted the test chamber 12. A vertical back plate 76, as best seen in Figures 2, 4 and 5, is provided on the right portion of the rear of the base 74 and there held in position by bolts 78 into the base 74. A bracket 75 near the upper end of the back plate 76 secures the flow gauge 20 to the back plate 76 for additional bracing. Bolted to the front of this back plate 76 by a pair of brackets 77 is the cylinder 38 and on the back side of back plate 76 is the accumulator 32. Also mounted on the back of the back plate 76 at approximately the same level as the test chamber 12 is the valve 24 below the plunger 26. Slot 79 in which the actuating member 28 secured to the closure member 16 moves to actuate the valve 24 is provided in back plate 76. Secured at the rear of the flow gauge 20 is the four-way valve assembly 46, as best seen in Figure 3. Of course other arrangements of mounting and location of these various elements may be made.

If desired, a filter (see Figure 1) 80 may be provided in the gas supply line 18. Also, normally a pressure gauge 82 is located in the gas supply line 18 to indicate the pressure in the system.

In operation, the movable guard member 58 is swung into the open position illustrated in Figure 5 and a predetermined weighed mass of fiber such as lint cotton is placed in the test chamber 12. The operator lowers the movable guard member 58 to the guard or vertical position shown in Figure 4. Upon such downward movement of the movable guard member 58 the bracket 68 on this movable guard member 58 bears against the plunger 66 of the limit switch 64 actuating the solenoid 54 of the four-way valve assembly 46. The four-way valve assembly 46 then opens the cylinder conduit 52 to air pressure from line 48 and supply line 18 and permits the air in the lower end of the cylinder 38 to exhaust through the cylinder conduit 50 and out the deflection conduit 34. The air pressure in the upper end of the cylinder 38 moves the piston 36 and hence the closure member 16 downwardly closing the test chamber 12 as best seen in Figure 4. The downward movement of the closure member 16 carries with it the actuating member 28 which contacts the plunger 26 on valve 24 opening this valve so that air from the supply line 18 passes through the accumulator 32, through the flow gauge 20, into the lower end of the test chamber 12, through the fiber 14, and out the passageway 30. As the system comes to an equilibrium the operator reads the rate of flow on the flow gauge 20, makes a notation, and then raises the movable guard member 58.

Opening of the movable guard member 58 removes the bracket 68 from the plunger 66 of the limit switch 64 thereby opening the electrical circuit 70 and de-energizing the solenoid 54 of the four-way valve assembly 46. This causes air under pressure to flow through the four-way valve assembly 46, through the conduit 50 to the lower end of cylinder 38 moving the piston 36 and the closure member 16 upwardly. The air on the upper side of the piston 36 exhausts through the cylinder conduit 52 and out the deflection conduit 34 at the upper end of the test chamber 12 and the apparatus 10 is then in the position shown in Figures 1 and 5. As the closure member 16 moves upwardly the actuating member 28 relieves pressure on the plunger 26 of valve 24 thereby closing the valve 24 to the further passage of air through it. The air pressure in the accumulator 32 exhausts into the lower end of the test chamber 12 ejecting the fiber sample 14 upwardly where it is met by a blast of air from the deflection conduit 34 and is deflected out of the working area.

Another weighed sample of cotton is then placed manually in the test chamber 12 and the movable guard member 58 is closed repeating the process.

Having the single control means which is operated by the movable guard member 58, the operator need merely insert the fiber sample in the test chamber 12, close the movable guard member 58, and at the completion of the test open the movable guard member 58. During the time the movable guard member 58 is closed the operator has both hands free and can make readings and notations without the necessity of operating any controls of the apparatus.

The present invention therefore is well suited to carry out the objects and attain the advantages mentioned as well as others inherent therein.

While only a single example of the apparatus has been given for the purpose of illustration, changes in many details, rearrangements of parts, and substitution of equivalents will suggest themselves to those skilled in the art. Accordingly, it is desired to be limited only by the spirit of the invention as defined by the scope of the appended claims.

What is claimed is:

1. An apparatus for measuring fiber permeability comprising, a test chamber, a supply line supplying gas to the test chamber, a gas flow gauge in the supply line, a valve in the supply line, a closure member mounted for movement into and out of the test chamber whereby the test chamber is opened and closed and a test specimen is compressed on closure, a passageway through the test chamber spaced from the supply line when the test chamber is closed, an actuating member moving with the closure member and actuating the valve so that the supply line is open when the test chamber is closed and is closed when the test chamber is open whereby gas flows through the supply line and test chamber when the test chamber is closed, and means to move the closure member into and out of the test chamber.

2. The apparatus of claim 1 where the means for moving the closure member into and out of the test chamber includes pneumatic means.

3. The apparatus of claim 1 in which the means for moving the closure member includes a cylinder, a piston in the cylinder connected to the closure member for reciprocating the closure member, cylinder conduits connected to the cylinder on each side of the piston, and valve means connected to the cylinder conduits and to a gas supply so constructed and arranged that gas under pressure moves the closure member in one direction into the test chamber and out of the test chamber in the other direction.

4. The apparatus of claim 1 including single control means controlling the means moving the closure member into and out of the test chamber.

5. The invention of claim 4 further comprising a movable guard member adjacent the test chamber, and actuating means cooperating between said guard member and said control means for controlling the means moving the closure member into and out of the test chamber upon movement of the guard member into and out of guard position.

6. An apparatus for measuring fiber permeability comprising, a test chamber, a supply line supplying gas to the test chamber, a gas flow gauge in the supply line, a valve in the supply line, a gas accumulator in the supply line between the valve and test chamber, a closure member mounted for movement into and out of the test chamber whereby the test chamber is opened and closed, a passageway through the test chamber spaced from the supply line when the test chamber is closed, an actuating member moving with the closure member and actuating the valve so that the supply line is open when the test chamber is closed and is closed when the test chamber is open whereby gas flows through the supply line and test chamber when the test chamber is closed and drains from the accumulator through the test chamber when the test chamber is open forcing fiber from the test chamber, and means to move the closure member into and out of the test chamber.

7. The apparatus of claim 6 including single control means for controlling the means for moving the closure member into and out of the test chamber.

8. An apparatus measuring fiber permeability comprising, a test chamber, a supply line supplying gas to the test chamber, a gas flow gauge in the supply line, a valve in the supply line, a gas accumulator in the supply line between the valve and test chamber, a closure member mounted for movement into and out of the test chamber whereby the test chamber is opened and closed, a passageway through the test chamber spaced from the supply line when the test chamber is closed, an actuating member moving with the closure member and actuating the valve so that the supply line is open when the test chamber is closed and is closed when the test chamber is open whereby gas flows through the supply line and test chamber when the test chamber is closed and drains from the accumulator through the test chamber when the test chamber is open forcing fiber from the test chamber, means for moving the closure member into and out of the test chamber, a deflection conduit having one end adjacent the upper end of the test chamber adapted to blow aside fiber ejected from the test chamber, means to supply gas to the deflection conduit, and single control means controlling the means for moving the closure member and the gas supply means so constructed and arranged that upon movement of the closure member out of the test chamber gas exhausts from the deflection conduit at the test chamber.

9. The apparatus of claim 8 in which the means for moving the closure member includes pneumatic means.

10. An apparatus for measuring fiber permeability comprising, a test chamber, a supply line supplying gas to the test chamber, a gas flow gauge in the supply line, a valve in the supply line, a gas accumulator in the supply line between the valve and test chamber, a closure member mounted for reciprocation into and out of the test chamber whereby the test chamber is opened and closed, a passageway through the test chamber spaced from the supply line when the test chamber is closed, an actuating member moving with the closure member and actuating the valve so that the supply line is open when the test chamber is closed and is closed when the test chamber is open whereby gas flows through the supply line and test chamber when the test chamber is closed and drains from the accumulator through the test chamber when the test chamber is open forcing fiber from the test chamber, a cylinder, a piston in the cylinder connected to the closure member for reciprocating the closure member, conduits connected to the cylinder on each side of the piston, and valve means connected to said cylinder conduits and to a gas supply so constructed and arranged that gas under pressure moves the closure member in one direction into the test chamber and in the other direction out of the test chamber.

11. The invention of claim 10 including a deflection conduit having one end adjacent the upper end of the test chamber adapted to blow aside fiber ejected from the test chamber, said deflection conduit, the cylinder conduits, and the gas supply being connected to valve means so constructed and arranged that gas under pressure moves the closure member in one direction into the test chamber and in the other direction out of the test chamber and upon such movement out of the test chamber gas exhausts from the deflection conduit at the test chamber.

12. An apparatus for measuring fiber permeability comprising, a test chamber, a supply line supplying gas to the test chamber, a gas flow gauge in the supply line, a valve in the supply line, a closure member for reciprocation into and out of the test chamber whereby the test chamber is opened and closed, a passageway through the test chamber spaced from the supply line when the test chamber is closed, an actuating member moving with the closure member and actuating the valve so that the supply line is open when the test chamber is closed and is closed when the test chamber is open whereby gas flows through the supply line and test chamber when the test chamber is closed, pneumatic means moving the closure member into and out of the test chamber, electrically actuated valve means connected to said pneumatic means for operating said pneumatic means, an electrical circuit actuating said pneumatic means, said electrical circuit being provided with a switch, and a movable guard member adjacent the test chamber, said guard member operating the switch upon movement into and out of guard position.

13. An apparatus for measuring fiber permeability comprising, a test chamber, a supply line supplying gas to the test chamber, a gas flow gauge in the supply line, a valve in the supply line, a gas accumulator in the supply line between the valve and test chamber, a closure member mounted for movement into and out of the test chamber whereby the test chamber is opened and closed, a passageway through the test chamber spaced from the supply line when the test chamber is closed, an actuating member moving with the closure member and actuating the valve so that the supply line is open when the test chamber is closed and is closed when the test chamber is open whereby gas flows through the supply line and test chamber when the test chamber is closed and drains from the accumulator through the test chamber when the test chamber is open forcing fiber from the test chamber, pneumatic means connected to said closure member for moving said closure member into and out of the test chamber, a deflection conduit having one end adjacent the upper end of the test chamber adapted to blow aside fiber ejected from the test chamber, electrically actuated valve means connected to said deflection conduit, to the pneumatic means, and to a gas supply so constructed and arranged that gas under pressure moves the closure member in one direction into the test chamber and in the other direction out of the test chamber and upon such movement out of the test chamber gas exhausts from the deflection conduit at the test chamber, an electrical circuit actuating said valve means, said electrical circuit being provided with a switch, and a movably mounted guard member adjacent the test chamber operating the switch upon movement of the guard member into and out of guard position.

14. In an apparatus for measuring fiber permeability including a test chamber, a supply line supplying gas to the test chamber, a closure member for movement into and out of the test chamber whereby the test chamber is opened and closed, the improvement comprising, a valve in the supply line, an actuating member moving with the closure member actuating the valve so that the supply line is open when the test chamber is closed and is closed when the test chamber is open whereby gas flows through the supply line into the test chamber when the test chamber is closed, pneumatically energized actuating means connected to said closure member for movement thereof into and out of said chamber, a guard member mounted for movement from an open position permitting access to said chamber to a closed position preventing entrance of the operator's fingers between said closure member and said chamber, and control means responsive to movement of said guard member between open and closed positions for operating said pneumatically energized actuating means.

15. In an apparatus for measuring fiber permeability including a test chamber, a supply line supplying gas to the test chamber, a closure member for movement into and out of the test chamber whereby the test chamber is opened and closed, the improvement comprising, a valve in the supply line, a gas accumulator in the supply line between the valve and test chamber, and an actuating member attached to the closure member and positioned so as to actuate the valve so that the supply line is open when the test chamber is closed and is closed when the test chamber is open whereby gas flows through the supply line and test chamber when the test chamber is closed, said accumulator so constructed so as to drain gas through the test chamber when the test chamber is open thereby forcing fiber from the test chamber.

16. In an apparatus for measuring fiber permeability including a test chamber and a closure member mounted for movement into and out of the test chamber whereby the test chamber is opened and closed, the improvement comprising, pneumatic cylinder means having an operating piston connected to the closure member for movement of the closure member into and out of the test chamber, a deflection conduit having one end adjacent the upper end of the test chamber, valve means connected to the deflection conduit, to the pneumatic cylinder means at both sides of said piston, and to a gas supply, said valve means having a first position for supplying gas under pressure to one side of said piston for moving the closure member in one direction into the test chamber and a second position for supplying gas under pressure to the other side of said piston to move the closure member in the other direction out of the test chamber and upon such movement out of the test chamber to supply gas to the deflection conduit at the test chamber thereby blowing aside fiber ejected from the test chamber, and single control means controlling the valve means.

References Cited in the file of this patent

UNITED STATES PATENTS

| 2,392,636 | Boehler | Jan. 8, 1946 |
| 2,771,769 | Nilsen | Nov. 27, 1956 |
| 2,791,120 | Dietert et al. | May 7, 1957 |